(12) United States Patent
Potter et al.

(10) Patent No.: US 10,891,745 B1
(45) Date of Patent: Jan. 12, 2021

(54) HYBRID SYSTEM WITH A STRUCTURED-LIGHT STEREO DEVICE AND A TIME OF FLIGHT DEVICE

(71) Applicants: Daniel E. Potter, San Jose, CA (US);
Bryce J. Remesch, San Jose, CA (US);
Chensong He, San Jose, CA (US);
Xiao Geng, Cupertino, CA (US)

(72) Inventors: Daniel E. Potter, San Jose, CA (US);
Bryce J. Remesch, San Jose, CA (US);
Chensong He, San Jose, CA (US);
Xiao Geng, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 47 days.

(21) Appl. No.: 16/055,355

(22) Filed: Aug. 6, 2018

Related U.S. Application Data (60) Provisional application No. 62/545,041, filed on Aug. 14, 2017.

(51) Int. Cl.
*G06T 7/521* (2017.01)
*G06T 7/593* (2017.01)
(Continued)

(52) U.S. Cl.
CPC .......... *G06T 7/521* (2017.01); *G01S 7/4808* (2013.01); *G01S 7/4865* (2013.01); *G01S 17/26* (2020.01);
(Continued)

(58) Field of Classification Search
CPC .......... G06T 7/521; G06T 7/85; G06T 7/596; G06T 2207/30261; G06T 2207/30256;
(Continued)

(56) References Cited

U.S. PATENT DOCUMENTS 10,003,787 B1 * 6/2018 Wan .......................... G06T 7/12
2014/0293055 A1 * 10/2014 Otsuka ................... B60Q 1/143
348/148

(Continued)

FOREIGN PATENT DOCUMENTS

WO 2017019725 A1 2/2017

OTHER PUBLICATIONS

Reliability Fusion of Time-of-Flight Depth and Stereo Geometry for High Quality Depth Maps IEEE Transactions on Pattern Analysis and Machine Intelligence, vol. 33, No. 7, Jul. 2011 Jiejie Zhu, Liang Wang, Ruigang Yang, James E. Davis and Zhigeng Pan.*

(Continued)

*Primary Examiner* — Marcos L Torres
(74) *Attorney, Agent, or Firm* — Young Basile Hanlon & MacFarlane, P.C.

(57) ABSTRACT

A system for real-time depth sensing includes a structured-light stereo device, a time of flight device, and a computing device. The computing device executes instructions that cause the computing device to determine depth measurements of a scene using information received by the structured-light stereo device and to determine time of flight measurements of the scene using information received by the time of flight device. The computing device executes further instructions that cause the computing device to generate a depth map using the depth measurements, to generate calibration points using the time of flight measurements, and to update the depth map using the calibration points.

20 Claims, 7 Drawing Sheets

(51) Int. Cl.
| | |
|---|---|
| *G06K 9/00* | (2006.01) |
| *G01S 17/89* | (2020.01) |
| *G01S 7/48* | (2006.01) |
| *G01S 7/4865* | (2020.01) |
| *G06T 7/80* | (2017.01) |
| *G01S 17/26* | (2020.01) |
| *G01S 17/931* | (2020.01) |

(52) U.S. Cl.
CPC ............ *G01S 17/89* (2013.01); *G01S 17/931* (2020.01); *G06K 9/00791* (2013.01); *G06T 7/596* (2017.01); *G06T 7/85* (2017.01); *G06T 2207/30256* (2013.01); *G06T 2207/30261* (2013.01)

(58) Field of Classification Search
CPC ...... G01S 17/89; G01S 17/936; G01S 7/4808; G01S 17/102; G01S 7/4865; G06K 9/00791
See application file for complete search history.

(56) References Cited

U.S. PATENT DOCUMENTS

| | | | | |
|---|---|---|---|---|
| 2017/0347079 | A1* | 11/2017 | Wang | H04N 9/3194 |
| 2018/0262744 | A1* | 9/2018 | Tadi | H04N 13/271 |
| 2018/0275278 | A1* | 9/2018 | Yamada | G01S 17/89 |
| 2018/0345794 | A1* | 12/2018 | Ohman | B60L 53/14 |
| 2019/0004533 | A1* | 1/2019 | Huang | G05D 1/0248 |

OTHER PUBLICATIONS

Huang, Albert S., et. al., "Visual Odometry and Mapping for Autonomous Flight Using an RGB-D Camera", Massachusetts Institute of Technology, Computer Science and Artificial Intelligence Laboratory, Date Unknown, https://pdfs.semanticscholar.org/57d6/f7993fde294d1cb47a4e777d44e0e5c3ad3f.pdf, Downloaded Apr. 24, 2018, 16 pp.

Ringbeck, Dr.-Ing. Thorsten, et al., "A 3D Time of Flight Camera for Object Detection", Optical 3-D Measurement Techniques, Dec. 2007, ETH Zurich, Plenary Session 1: Range Imaging I, http://www.ifm.com/obj/O1D_Paper-PMD.pdf, 10 pp.

Corrigan, Fintan, "Time of Flight Camera Sensors on Drones and 10 Terrific Uses", DroneZon, Drone Technology, Knowledge, News & Reviews, https://www.dronezon.com/learn-about-drones-quadcopters/best-uses-for-time-of-flight-tof-camera-depth-sensor-technology-in-drones-or-ground-based/, Mar. 4, 2018, Downloaded Apr. 24, 2018, 24 pp.

Horaud, Radu, "A Short Tutorial on Three-Dimensional Cameras", INRIA Grenoble Rhone-Alpes, Date Unknown, http://perception.inrialpes.fr/~Horaud/Courses/pdf/Horaud_3Dcameras_tutorial.pdf, Downloaded Apr. 24, 2018, 44 pp.

Gupta, Mohit, "Scene Recovery and Rendering Techniques Under Global Light Transport", The Robotics Institute, School of Computer Science, Oct. 2010, http://www.cs.cmu.edu/~mohitg/PhDThesis.pdf, 130 pp.

\* cited by examiner

HYBRID SYSTEM WITH A STRUCTURED-LIGHT STEREO DEVICE AND A TIME OF FLIGHT DEVICE

CROSS-REFERENCE TO RELATED APPLICATIONS

This application claims the benefit of U.S. Provisional Patent Application Ser. No. 62/545,041, filed on Aug. 14, 2017, and entitled "Hybrid System with a Structured-Light Stereo Device and a Time of Flight Device," the content of which is incorporated herein by reference for all purposes.

TECHNICAL FIELD

This disclosure relates to a hybrid system with a structured-light stereo device and a time of flight device for real-time depth sensing.

BACKGROUND

High resolution, range and reflectance measurement is valuable for a wide range of applications. A number of remote sensing methodologies can be used to gather depth information using various sensors and measurements but the resolution of the sensors and measurements over varying distances and varying conditions impact accuracy.

SUMMARY

One aspect of the disclosure is a system for real-time depth sensing comprises a structured-light stereo device, a time of flight device, and a computing device. The computing device executes instructions that cause the computing device to determine depth measurements of a scene using information received by the structured-light stereo device and to determine time of flight measurements of the scene using information received by the time of flight device. The computing device executes further instructions that cause the computing device to generate a depth map using the depth measurements, to generate calibration points using the time of flight measurements, and to update the depth map using the calibration points.

Another aspect of the disclosure is a method that includes determining depth measurements of a scene using information from a structured-light stereo device, determining time of flight measurements of the scene using information from a time of flight device, generating a depth map using the depth measurements, generating calibration points using the time of flight measurements, updating the depth map using the calibration points, and controlling operation of an automated system based on the depth map.

Another aspect of the disclosure is a method that includes generating a hybrid pattern image that includes structured-light information and Light Detection and Ranging (LIDAR)/radar information, projecting the hybrid pattern image onto at least a portion of a scene to generate a projection, performing a synchronized data capture in response to the projection, generating a depth map based on the synchronized data capture, generating a plurality of calibration points based on the LIDAR/radar information, performing a real-time camera calibration based on the depth map and the plurality of calibration points, and generating an updated depth map based on the depth map and a result of the real-time camera calibration.

BRIEF DESCRIPTION OF THE DRAWINGS

The description herein makes reference to the accompanying drawings, wherein like reference numerals refer to like parts throughout the several views.

DETAILED DESCRIPTION

Remote sensing methodologies can be used to gather depth information. These remote sensing methodologies include but are not limited to time of flight measurements (direct or phase demodulation), stereoscopic measurements, structured-light stereo, and depth through focus. Time of flight measurements are distance measurements based on a time of flight device measuring the time of flight (or time that it takes) an object, particle, acoustic, electromagnetic, light pulse, or other wave to travel a distance through a medium (e.g., the time it takes for light to be emitted from a light source in the direction of an object/scene and to be detected by a light sensor after it reflects off the object/scene). For shorter standoff distances, structured light and stereo techniques carried out by a structured-light stereo device are accurate and achieve high resolution but have a steeply falling (quadratic) range error function (i.e., structured light and stereo techniques get less accurate over longer distances) and are sensitive to the time variability of the position and orientation of the cameras and light sources. For field applications that utilize moving and vibrating platforms, these position and orientation errors can dominate the depth accuracy barring expensive, high mass, or active stabilized mechanical mounting implementations. Comparatively, the accuracy from time of flight measurements are not highly correlated with distance compared to the error sources from structured light or stereo depth sensing measurements (i.e., time of flight measurements are more accurate than structured light and stereo techniques over longer distances).

The present disclosure provides a hybrid system with a structured-light stereo device (also referred to as a device that provides laser triangulation or structured-light pattern projection) and a time of flight device for real-time depth sensing that can determine more accurate range and reflectance measurements. The hybrid system provides high resolution, real-time depth sensing that can be used by automated systems for a wide range of applications including but not limited to autonomous vehicles, robotics, and industrial manufacturing. For example, the real-time depth sensing of the hybrid system can by an automated system to make a control decision that affects operation of the automated systems, such as a control decision to start operation of the automated system, a control decision to stop operation of the automated system, or a control decision that affects motion of the automated system (e.g., by accelerating, decelerating, or turning. The hybrid system enables the enhanced measurement of range/depth and reflectivity of a scene and associated objects through simultaneous application of multiple modalities (i.e., depth measurements/pixels are determined using the structured-light stereo device and time of flight measurements/pixels are determined using the time of flight device).

The hybrid system can be incorporated into the space typically occupied by each headlight on the front of a vehicle (e.g., manually operated, semi-autonomous, fully autonomous, or any combination thereof). Placing the hybrid system into the headlight space allows for the incorporation of less noticeable apertures that are still large by leveraging the lens systems of the headlights of current vehicles. These headlight lens systems are less noticeable in comparison to systems mounted on the top of the vehicle, so there is less of a need to hide the system compared with other placement options such as on the vehicle's roof. The hybrid system can be incorporated into the common aperture headlight system of the vehicle to take advantage of Helmholtz reciprocity in which the reflective/scattering properties do not depend on the directionality of the incident light.

Absolute depth measurements using structured-light stereo devices are limited by the calibration of the orientation of the camera/illumination systems, the illuminator power requirements, the sensitivity of the sensors, and the determination of a signal to provide accurate spatial registration of the disparity and/or comparison to a reference signal. The hybrid system described herein provides real-time calibration that structured-light stereo devices alone cannot provide. The hybrid system generates, via the structured-light stereo device, depth measurements associated with a scene and simultaneously generates, via the time of flight device (e.g., a LIDAR system), spatially sparse time of flight measurements associated with the scene. The hybrid system can generate calibration points of known distances from these measurements and the calibration points allow for the calibration of orientation, scene distortion, and reflectivity to improve the reconstruction of depth information (e.g., depth maps and reflectivity maps) derived from the structured-light stereo image data and information (e.g., depth measurements). The calibration point can be an indicator that includes a calculated distance and a timestamp.

The hybrid system also provides high spatial resolution coverage that time of flight devices or LIDAR systems alone cannot provide. The high spatial resolution coverage and depth information can be used to provide more accurate and higher resolution reflectivity maps of the scene. In some implementations, based on bandwidth and constraints, the hybrid system can provide lower spatial resolution coverage by combining sparse LIDAR and a single camera that is spatially registered. In addition, because the hybrid system in accordance with the present disclosure is calibrated using the time of flight measurements (and resulting depth keypoints/calibration points), the design of the hybrid system and integration into the vehicle can be streamlined. As an example, the optical distortion requirements of the camera or the projector lens and the camera mounting requirements can be lessened based on the enhanced accuracy garnered from the hybrid system.

To describe the features of the present invention in more detail, refer now to the following description in conjunction with the accompanying Figures.

Figure 1:
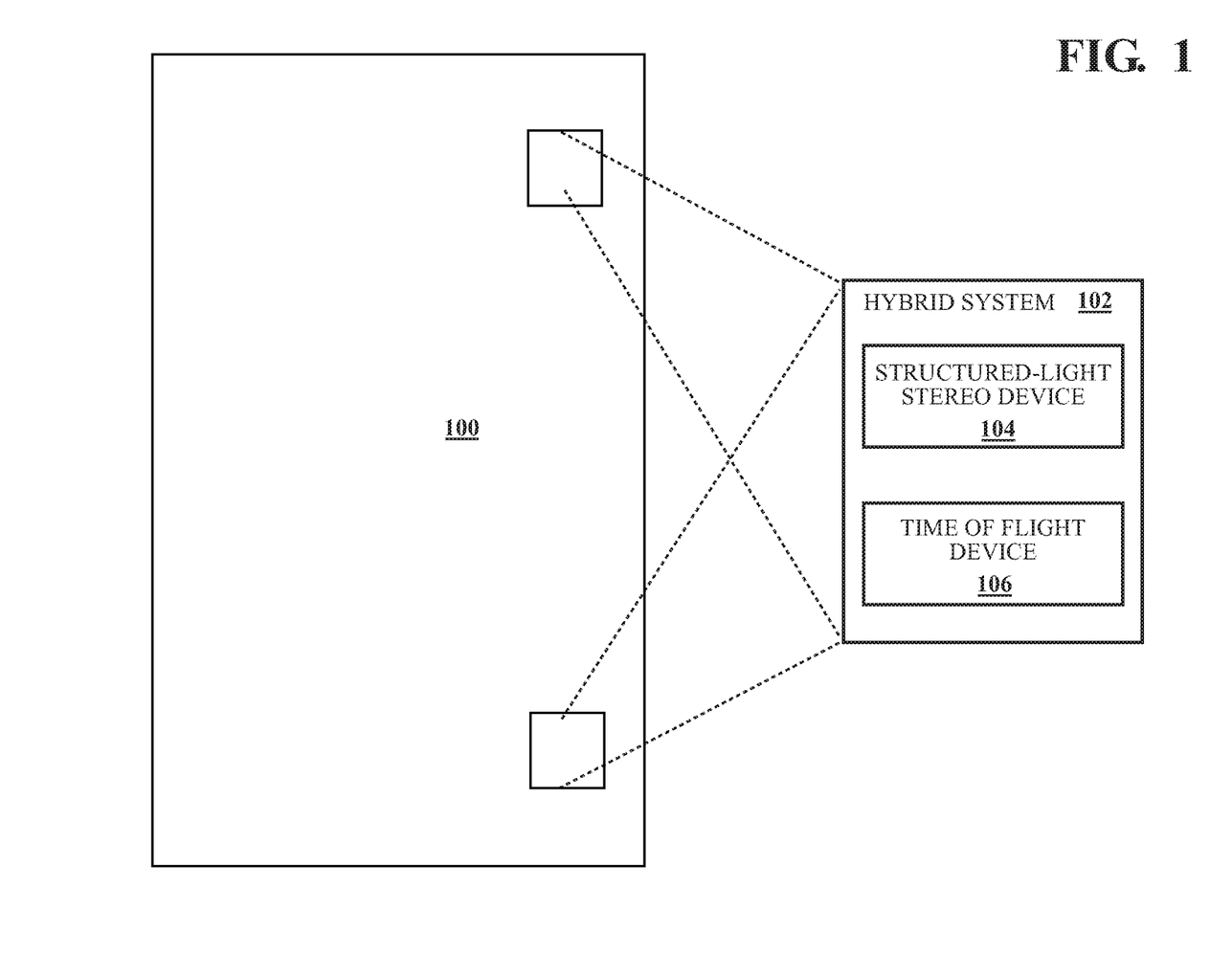
FIG. 1 is a diagram illustrating an example of a vehicle using real-time depth sensing.

FIG. 1 is a diagram illustrating an example of a vehicle 100 using real-time depth sensing. The vehicle 100 can be manually operated, semi-autonomous, fully autonomous, or any combination thereof. The vehicle 100 can be a robot or a machine. The vehicle 100 includes a hybrid system 102 that comprises both a structured-light stereo device 104 and a time of flight device 106. The structured-light stereo device 104 and the time of flight device 106 are components of the hybrid system 102 and can be either housed in the same location/area or in different locations of the vehicle 100. As an example, the structured-light stereo device 104 and the time of flight device 106 components can both be housed within each headlight of the vehicle 100 (i.e., the first headlight located on the front-left of the vehicle and the second headlight located on the front-right of the vehicle). The vehicle 100 can also include the structured-light stereo device 104 and the time of flight device 106 as separate components or sub-systems that are not housed together.

In some implementations, the structured-light stereo device 104 comprises at least one camera and at least one light source (e.g., an illuminator, light bulbs, LED lights, fluorescent tubes, light arrays, light emitters, etc.). The time of flight device 106 can be a LIDAR/radar device that comprises at least one light sensor and at least one light source. The structured-light stereo device 104 and the time of flight device 106 components can share components that carry out similar functions including but not limited to the light source. As an example, the structured-light stereo device 104 and the time of flight device 106 can share a light source or they can each utilize a separate light source thereby resulting in at least two separate light sources being located within the hybrid system 102.

Figure 2:
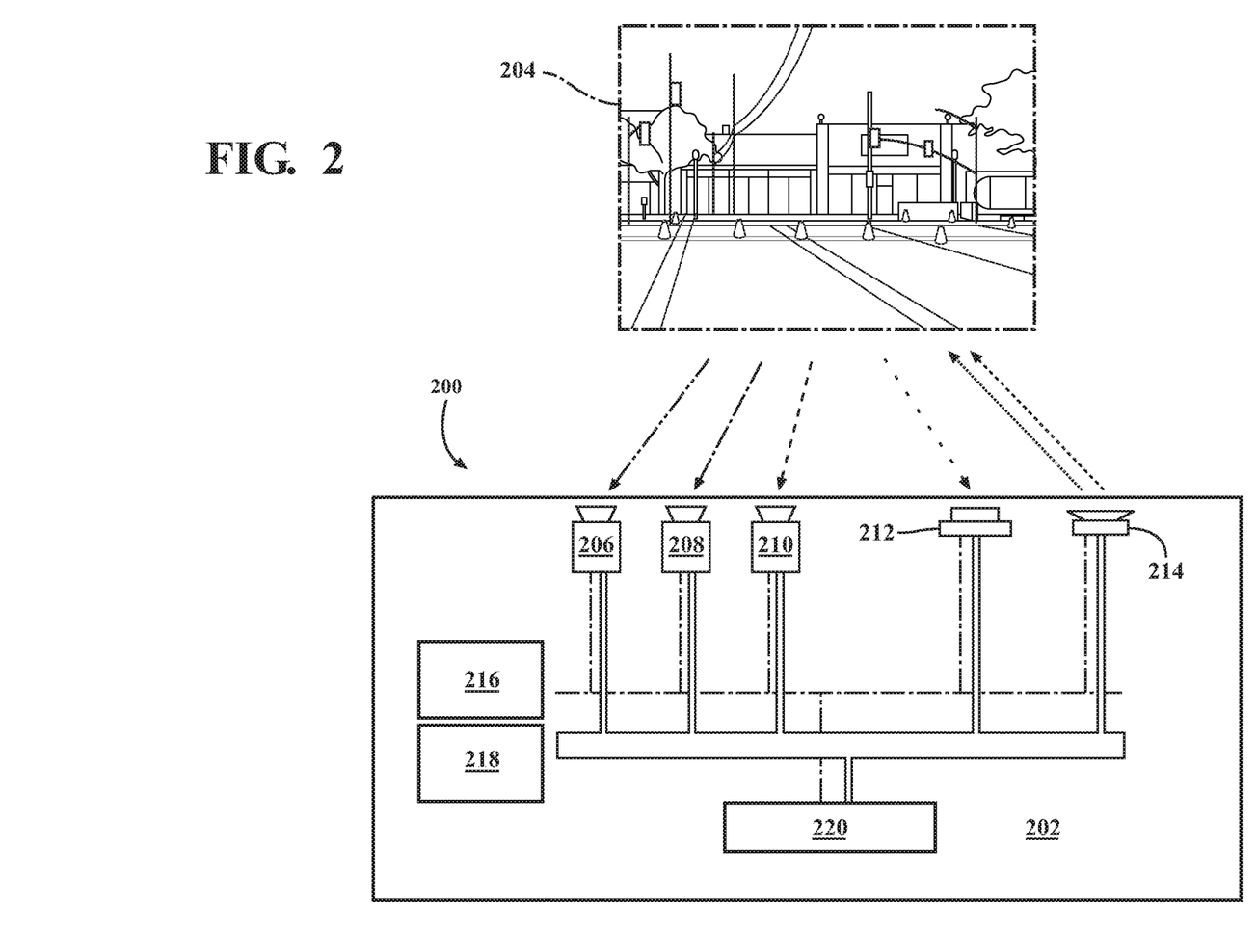
FIG. 2 is a diagram illustrating an example of a vehicle using real-time depth sensing.

FIG. 2 is a diagram illustrating an example of a vehicle 200 using real-time depth sensing. The vehicle 200 includes a hybrid system 202 (that is similar to the hybrid system 102 of FIG. 1). The hybrid system 202 provides real-time depth sensing of a scene 204 that can include a plurality of objects (e.g., orange cones in the middle of an intersection). The hybrid system 202 includes a plurality of cameras including but not limited to a first camera 206, a second camera 208, and a third camera 210. The hybrid system 202 also includes a light sensor 212 and a light source 214.

The hybrid system 202 (as shown in FIG. 2) is configured with the first camera 206 of the three cameras 206-210 on the left edge, followed by the light sensor 212 to the right of the third camera 210, followed by the light source 214 to the right of the light sensor 212. The cameras 206-210, the light sensor 212, and the light source 214 as well as any additional devices or components of the hybrid system 202 can be configured in any combination. The combination of the cameras 206-210 and the light source 214 provide a structured-light stereo device (that can be similar to the structured-light stereo device 104 of FIG. 1) and the combination of the light sensor 212 and the light source 214 provide a time of flight device (that can be similar to the time of flight device 106 of FIG. 1). Therefore, the hybrid system 202 of the vehicle 200 includes a structured-light stereo device and a time of flight device.

By providing one light source 214 within the hybrid system 202, data that is detected or captured by the cameras 206-210 and the light sensor 212 in response to the light source 214 being activated (i.e., projecting a light or an image onto the scene 204) can be synchronized. In some implementations, the hybrid system 202 can include two or more light sources with one light source for the structured-light stereo device and the other light source for the time of flight device. The activation of the two or more light sources can be synchronized via various timing mechanisms (e.g., electronic and optical time-syncing) to enable the synchronized data capture capabilities of the hybrid system 202.

In the hybrid system 202, each of the cameras 206-210, the light sensor 212, and the light source 214 can be connected to a time sync bus 216 and to a data/control bus 218. The time sync bus 216 and the data/control bus 218 are both connected to a processor 220 of a computing device of the hybrid system 202 or another computing device of the vehicle 200. The time sync bus 216 provides time-syncing between the structured-light stereo device and the time of flight device. The time sync bus 216 can be controlled by a timer (not shown) of the hybrid system 202 or of the vehicle 200 that provides electronic time-syncing. The timer can provide time-syncing optically by encoding the timing information (in addition to the position information) associated with data of the structured-light stereo device in the signal of the time of flight device (and also by encoding the timing and position information associated with data of the time of flight device in the signal of the structured-light stereo device). Accordingly, metadata and timing information associated with both components of the hybrid system 202 are shared between each other to conduct the time-syncing of the image projection and corresponding data capture. The information can be automatically shared between components of the hybrid system 202 or each of the components can broadcast the information to the other via various communication mechanisms (e.g., WiFi, Bluetooth, etc.).

The time sync bus 216 and the data/control bus 218 can work in tandem to ensure that data being captured by the first camera 206, the second camera 208, the third camera 210, and the light sensor 212 is time synchronized to enable the vehicle 200 to calibrate and enhance various mapping outputs (e.g., depth maps, reflectivity maps, etc.) that are generated by the vehicle 200 thereby optimizing the navigation or other functionalities of the vehicle 200.

The hybrid system (e.g., the hybrid system 102 of FIG. 1 or the hybrid system 202 of FIG. 2) provides Helmholtz reciprocity by using the baseline from a headlight of a vehicle (e.g., the vehicle 100 of FIG. 1 or the vehicle 200 of FIG. 2) and by normalizing angle dependent optical properties of a scene (e.g., objects) with common aperture systems or with systems that have redundant illumination and sensing angles. The information garnered via the process can be used for a variety of purposes including but not limited to: measuring ambient light; developing disparity maps via structured-light stereo devices that are independent of variable illumination angles; providing a multiple-aperture structured-light filter that can prevent ambiguity in depth reconstruction when a deviation from Helmholtz reciprocity is not met which indicates an obstruction or blind spot from one of the viewing angles; measuring relative intensity of illuminators/optical throughput which can be calibrated using time average relative to reciprocity expectations; measuring optical properties of the scene including remote material detection (e.g., ice, water, oil on the roadways, etc.) using the reciprocity angle that changes to build up the bidirectional reflectance distribution function (BRDF) as the vehicle moves (i.e., is navigated or driven) through the scene; and simultaneously measuring time of flight depth, reflectivity, structured-light stereo depth, and orientation angle when used in conjunction with a time of flight device (through phase or direct measure) as a bi-directional Light Detection and Ranging (LIDAR) device to extend the range and accuracy of the depth information.

Figure 3:
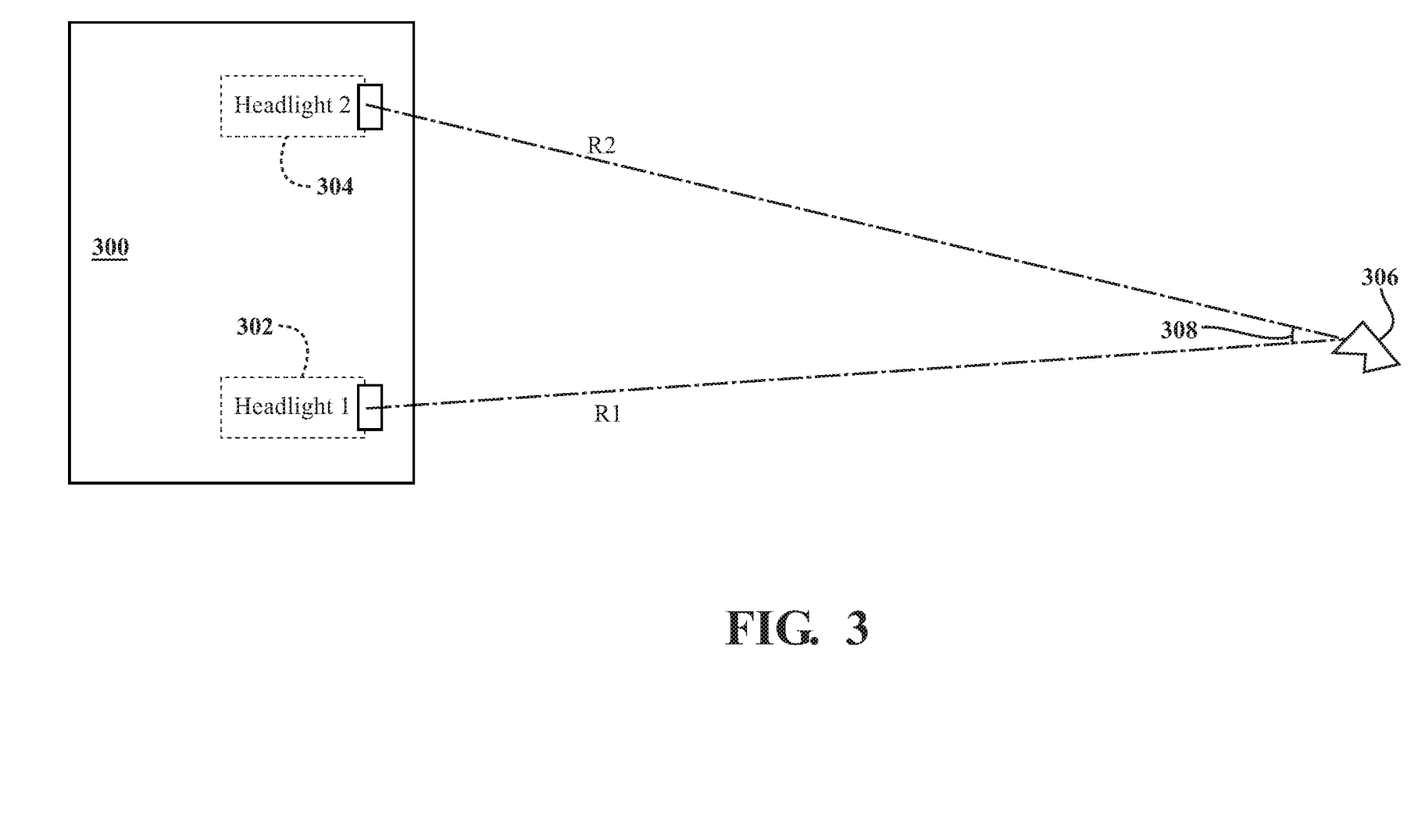
FIG. 3 is a diagram illustrating an example of a structured-light stereo device for generating depth measurements.

FIG. 3 is a diagram illustrating an example of a structured-light stereo device 300 for generating depth measurements. The structured-light stereo device 300 is similar to the structured-light stereo device 104 of the hybrid system 102 of FIG. 1 and is similar to the structured-light stereo device that is part of the hybrid system 202 of FIG. 2. The structured-light stereo device 300 can be housed within each headlight space of a vehicle such as the vehicle 100 of FIG. 1 or the vehicle 200 of FIG. 2. The structured-light stereo device 300 includes a common aperture illuminator camera system that is dual aperture and can comprise a first illuminator and a first camera within a first headlight 302 and can comprise a second illuminator and a second camera within a second headlight 304. The first and second illuminator can also be referred to as light sources.

Based on the shared housing and structure, scattering properties that result from using the common aperture illuminator camera system of the structured-light stereo device 300 are the same via Helmholtz reciprocity. As a result, as the first and second illuminators activate and project light or an image onto an object 306, the same angle is produced when the first and second cameras capture data in response to the projection by the first and second illuminators. As an example, the projection of a first signal (R1) by the first illuminator of the first headlight 302 and the reflection of a second signal (R2) off the object 306 that is detected by the second camera of the second headlight 304 produces a reflection angle 308. The reflection angle 308 is the same as would be produced via the projection of a third signal (not shown) by the second illuminator of the second headlight 304 and the reflection of a fourth signal (not shown) off the object 306 that is detected by the first camera of the first headlight 302. Accordingly, the common aperture illuminator camera system provides for the reflection angle 308 between the first illuminator (of the first headlight 302) and the second camera (of the second headlight 304) that is the same between the second illuminator (of the second headlight 304) and the first camera (of the first headlight 302).

Figure 4:
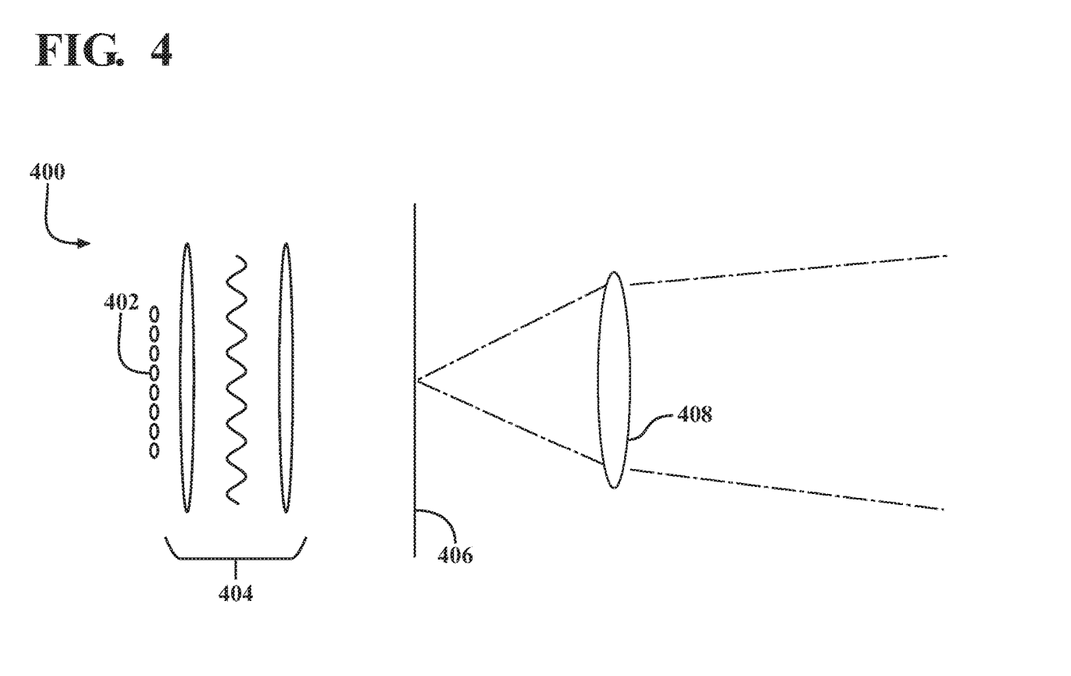
FIG. 4 is a diagram illustrating an example of a light source of a time of flight device for generating time of flight measurements.

FIG. 4 is a diagram illustrating an example of a light source 400 of a time of flight device for generating time of flight measurements. The light source 400 can also be referred to as an illuminator or illumination system and the time of flight device can also be referred to as a LIDAR system. The time of flight device is similar to the time of flight device 106 of FIG. 1, and the time of flight device that is part of the hybrid system 202 of FIG. 2. The time of flight device includes both the light source 400 and a light sensor. The light source 400 is a device that can comprise a plurality of light sources or a single light source and a plurality of other types of devices (e.g., modulators). The time of flight measurements comprise the time between the moment that the light is emitted from the light source 400 and the moment that the same light is incident upon the light sensor after being reflected by an object in a scene. The light source 400 includes a light emitter that comprises a vertical-cavity surface-emitting laser (VCSEL) array 402, a phase modulator 404 in series with the VCSEL array 402, a projection image plane 406, and projection optics 408. In some implementations, the light emitter is a LED array or another type of light emitting array.

The VCSEL array 402 can be pulsed or modulated both spatially and temporally and can have a variety of wavelengths. As an example, and referring to FIG. 1 and FIG. 4 in combination, more than one VCSEL array 402 (or another type of light emitter) can be provided within the hybrid system 102 to provide a separate light source for both the structured-light stereo device 104 and the time of flight device 106. The VCSEL array 402 (or another type of light emitter) can also be split so that a top portion (or a first portion) of the VCSEL array 402 is used as the light source of the structured-light stereo device 104 and a bottom portion (or a second portion) of the VCSEL array 402 is used as the light source of the time of flight device 106.

The VCSEL array 402 can be modulated by the phase modulator 404 between detailed images (e.g., an image created using an array of light sources) or less detailed images (e.g., a line). The modulation of the VCSEL array 402 can be based on a variety of circumstances or factors including but not limited to images captured from a camera (e.g., a specific type of object is detected and a specific pattern optimized for that object is projected), mapping information (e.g., known traffic light coming up ahead with pedestrian traffic), route information (e.g., very narrow roads coming up ahead or roads with roadways in poor condition), and historical information (e.g., operational patterns of the vehicle). The patterns that are projected can depend on the needs of the vehicle (e.g., tradeoff between depth resolution and spatial resolution). The changes in patterns can be actively or dynamically adaptable using machine learning techniques that learn from similar situations that the vehicle (e.g., vehicle 100 of FIG. 1) has navigated.

As an example, and referring to FIG. 1 and FIG. 4 in combination, at high speeds, information from further out distances may be required or beneficial (i.e., depth information is important to safely navigating the vehicle 100), and the vehicle 100 can utilize more information from the time of flight device 106. Conversely, at slow speeds and on a bumpy road with a lot of potholes, the vehicle 100 can utilize more information from the structured-light stereo device 104. As the vehicle 100 drives through similar bumpy roads, it may project a specific pattern that previously resulted in the most accurate information or depth information resolution from the structured-light stereo device 104. As another example, time of flight devices such as LIDAR systems struggle to capture accurate information when the roadways are wet and the hybrid system 102 can switch from a hybrid mode that processes information from both the structured-light stereo device 104 and the time of flight device 106 into a mode that captures data using only or predominantly the structured-light stereo device 104. As another example, if the vehicle 100 is approaching a sharp turn, the hybrid system 102 can recognize that road surface information (e.g., smooth, rocks on the road, substance or oil spills, wet or icy based on shiny reflections, etc.) is important and needed and can then focus on using the structured-light stereo device 104 to provide depth measurements and high resolution information regarding the road surface conditions (and not a hybrid approach because the time of flight measurements may not provide accurate road surface information).

The phase modulator 404 can be synchronized to an imaging camera (including but not limited to the cameras of the structured-light stereo device 300 of FIG. 3) and/or to a time of flight device array to either steer the concentrated point source array or to defocus the point sources into more homogenous patterns or specified structured-light patterns. The light source 400 can switch between imaging and time of flight modes. The light source 400 can include an amplitude (or pulsed) modulator in addition to the phase modulator 404. The light source 400 can also include other types of modulators including but not limited to frequency modulators. Once the light or image (e.g., hybrid pattern image) is produced or projected by the VCSEL array 402 and modulated by the phase modulator 404, the projected image changes from structured to broad as it passes through the projection image plane 406 and onto the object via the projection optics 408. The projection image plane 406 and the projection optics 408 can serve as the projection optical system that provides a common optical path. The projection optics 408 can also enhance or alter the image or pattern that is projected. Another common aperture system could be placed before the phase modulator 404 to enable depth from focus.

Figure 5:
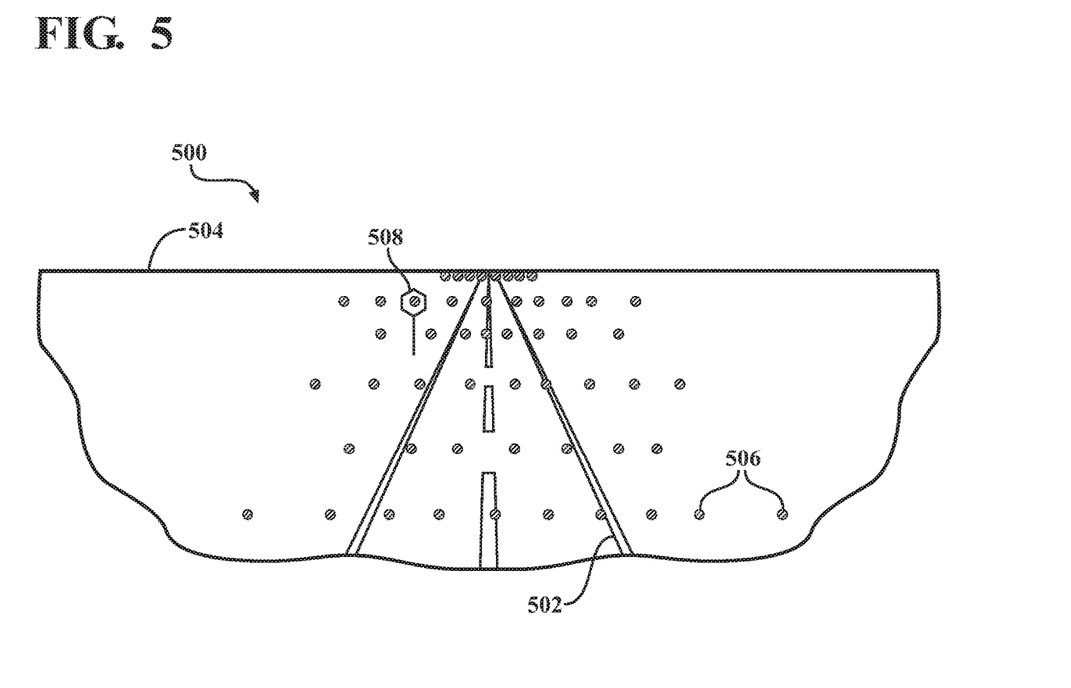
FIG. 5 is a diagram illustrating a display of a superimposed combination of the depth measurements and the time of flight measurements.

FIG. 5 is a diagram illustrating a display 500 of a superimposed combination of depth measurements and time of flight measurements. The display 500 can be produced using the systems and devices described with respect to FIGS. 1-4, including but not limited to a vehicle (e.g., the vehicle 100 of FIG. 1 or the vehicle 200 of FIG. 2) that includes a computing device and a hybrid system (e.g., the hybrid system 102 of FIG. 1 or the hybrid system 202 of FIG. 2) having a structured-light stereo device and a time of flight device. The display 500 includes a roadway 502 associated with a scene, a broad structured-light stereo coverage area 504, time of flight measurements 506, and an object 508 associated with the scene. The object 508 can be a variety of objects including but not limited to a stop sign near the roadway 502, another vehicle, and a building. The broad-structured-light stereo coverage area 504 can include the depth measurements determined via a structured-light stereo device (e.g., the structured-light stereo device 104 of FIG. 1).

As an example, and referring to FIG. 1 and FIG. 5 in combination, the display 500 can be provided by the vehicle 100 of FIG. 1 that is navigating down the roadway 502. The vehicle 100 can include the hybrid system 102 that determines the depth measurements associated with the broad structured-light stereo coverage area 504 via the structured-light stereo device 104 and that determines spatially sparse time of flight measurements 506 via the time of flight device 106. The depth measurements can be processed to generate a variety of maps including but not limited to a depth map that provides depth information regarding the scene surrounding the vehicle 100. The time of flight measurements 506 include a plurality of time of flight measurements that are interspersed throughout the broad structured-light stereo coverage area 504 that includes the depth measurements. The time of flight measurements 506 can be superimposed upon the depth measurements of the broad structured-light stereo coverage area 504 by the time of flight device 106 generating depth keypoints (calibration points) based on synchronizing the data capture conducted by both the structured-light stereo device 104 and the time of flight device 106. The synchronization can include time-syncing and position syncing.

The calibration points are generated via the time of flight device 106 by calculating known distances or relative offset measurements between the depth measurements and the time of flight measurements 506 that are each associated with time-synced image projections and corresponding data (e.g., images) associated with the scene. In some implementations, the calibration point can be an indicator that includes a calculated distance and a timestamp. As an example, and referring to FIG. 1 and FIG. 5 in combination, the hybrid system 102, via the time of flight device 106, can determine that the object 508 (e.g., a stop sign) is a predetermined distance ahead (e.g., 20 feet) of the vehicle 100, and the time of flight measurements 506 associated with the image of the object 508 can be marked with an indicator that includes the calculated distance and a timestamp (and other information including but not limited to a last calibration date of the hybrid system 102) to generate a calibration point associated with that portion of the scene. Additional calibration points can be calculated using similar mechanisms or historical information.

The generated calibration points can be utilized to map the time of flight measurements 506 to the depth measurements thereby facilitating a calibration process that can result in enhanced depth measurements and resulting outputs (e.g., updated depth maps) generated by the hybrid system 102 of FIG. 1. As an example, the calibration points and the comparison between the depth measurements and related information (determined by the structured-light stereo device 104) and the time of flight measurements 506 and related information (determined by the time of flight device 106) can be utilized to conduct real-time calibration of cameras associated with the hybrid system 102 thereby enabling the various information including but not limited to maps outputted by the hybrid system 102 to be updated or enhanced.

Once an object of interest (e.g., the object 508) has been detected within the scene, the hybrid system 102 can focus the determination of the time of flight measurements 506 on a portion of the scene that includes the object 508 (e.g., representing a stop sign) next to the roadway 502. By focusing the time of flight measurements 506 on the object 508, the hybrid system 102 can provide additional information (e.g., more focused depth and reflectivity maps that zero in on the object 508 as opposed to providing maps that more broadly depict the entire scene) associated with the object 508 to enable the vehicle 100 to properly navigate the roadway 502 (e.g., stop at the stop sign).

Figure 6:
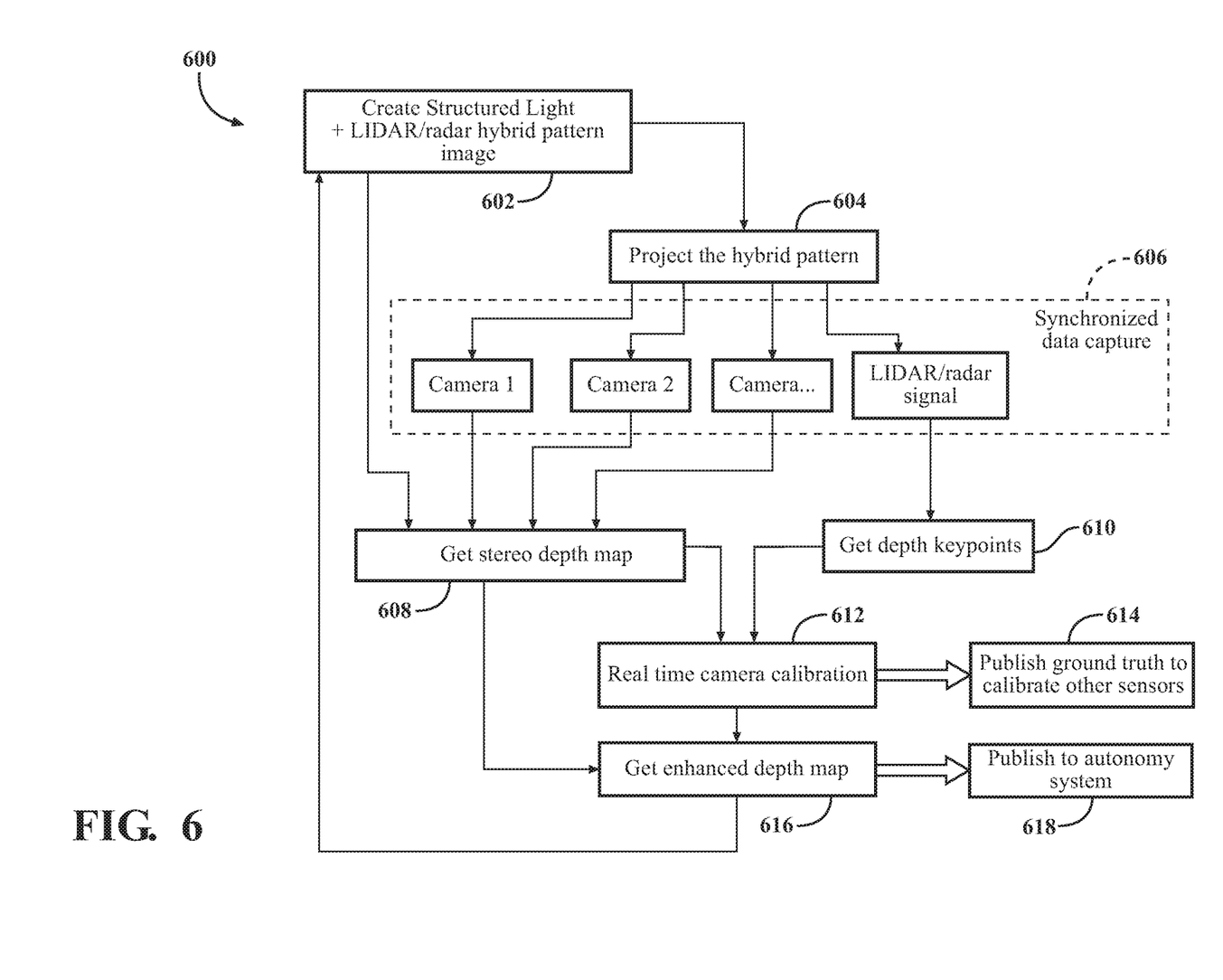
FIG. 6 is a flow chart illustrating a method for projecting hybrid pattern images to enhance depth maps.

FIG. 6 is a flow chart illustrating a method 600 for projecting hybrid pattern images to enhance depth maps. The method 600 can be executed using the systems and devices described with respect to FIGS. 1-4, including but not limited to a vehicle (e.g., the vehicle 100 of FIG. 1 or the vehicle 200 of FIG. 2) that includes a computing device and a hybrid system having a structured-light stereo device and a time of flight device. The structured-light stereo device and the time of flight device components or sub-systems can be housed within the same headlight space of the vehicle, can be housed in another shared location (e.g., on the top of the vehicle, on the front of the vehicle near the license plate housing, etc.), or can be housed within the vehicle using a different configuration. The method 600 can be performed, for example, by executing a machine-readable program or other computer-executable instructions. The method 600 can be implemented directly in hardware, firmware, software executed by hardware, circuitry, or a combination thereof.

The method 600 includes generating a structured-light and LIDAR/radar hybrid pattern image, via operation 602, projecting the hybrid pattern image onto at least a portion of a scene or object, via operation 604, and synchronizing data that is captured or detected in response to the projection, via operation 606. The projection via operation 606 can be carried out by the hybrid system of the vehicle (e.g., the hybrid system 102 of the vehicle 100 of FIG. 1). The hybrid system can comprise a variety of devices in a variety of configurations including but not limited to at least one illuminator (or light source), a plurality of cameras (e.g., camera 1, camera 2, etc.), and at least one light sensor. The structured-light stereo device of the hybrid system can comprise at least one illuminator/light source and at least one or a plurality of cameras. The time of flight device component of the hybrid system can comprise at least one illuminator/light source (e.g., the same light source utilized by the structured-light stereo device or an additional light source) and a light sensor (i.e., a sensor that can measure LIDAR/radar signals). In some implementations, the hybrid system can include more than one light source, more than one light sensor, and more than two cameras in various configurations.

After the synchronized data capture of operation 606, data (e.g., depth measurements) determined using the cameras of the structured-light stereo device of the hybrid system is utilized in combination with the hybrid pattern image (generated via operation 602) to generate a stereo depth map (i.e., a depth map), via operation 608. Simultaneously, after the synchronized data capture of operation 606, data (e.g., time of flight measurements) determined using the LIDAR/radar signals processed by the time of flight device component of the hybrid system is utilized to generate depth keypoints (i.e., calibration points), via operation 610. The calibration points can be calculated as relative offset measurements between time-synced data points of the depth measurements from the structured-light stereo device that correspond to the time of flight measurements from the time of flight device.

The method 600 includes providing real-time camera calibration using the generated stereo depth map and depth keypoints, via operation 612. After the real-time camera calibration of operation 612, the method 600 includes publishing ground truth information to calibrate other sensors of the vehicle, via operation 614. In addition, the generated stereo depth map (from operation 608) and the results of the real-time camera calibration (from operation 612) are utilized to generate an enhanced or updated depth map, via operation 616. The enhanced depth map can be published to an autonomy system of the vehicle via operation 618 to aid in the navigation or other functioning of the vehicle. For example, the enhanced depth map can be used by the autonomy system of the vehicle to make a control decision that affects motion of the vehicle, such as a control decision to accelerate, a control decision to decelerate, or a control decision to turn.

Figure 7:
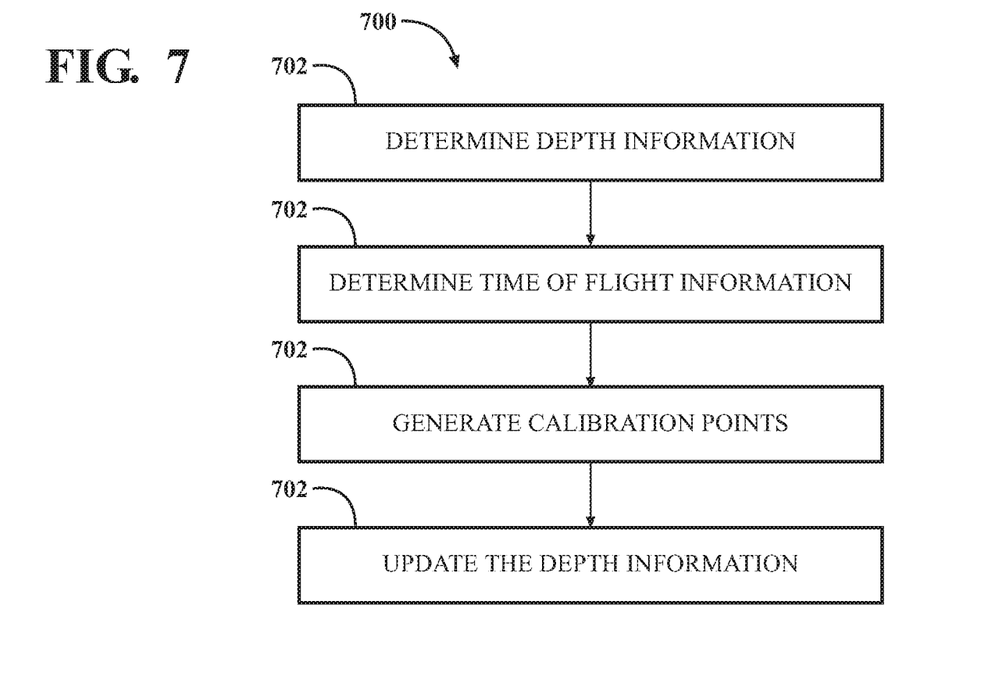
FIG. 7 is a flow chart illustrating a method for real-time depth sensing.

FIG. 7 is a flow chart illustrating a method 700 for real-time depth sensing. The real-time depth sensing can be used for a plurality of applications including but not limited to any of autonomous vehicle applications, robotics applications, and industrial manufacturing applications. The method 700 can be executed using the systems and devices described with respect to FIGS. 1-4, including but not limited to a vehicle (e.g., the vehicle 100 of FIG. 1 or the vehicle 200 of FIG. 2) that includes a computing device and a hybrid system having a structured-light stereo device and a time of flight device. The structured-light stereo device and time of flight device components or sub-systems can be housed within the same headlight space of the vehicle, can be housed in another shared location (e.g., on the top of the vehicle, on the front of the vehicle near the license plate housing, etc.), or can be housed within the vehicle using a different configuration. The method 700 can be performed, for example, by executing a machine-readable program or other computer-executable instructions. The method 700 can be implemented directly in hardware, firmware, software executed by hardware, circuitry, or a combination thereof.

The method 700 includes determining depth information, via operation 702, determining time of flight information, via operation 704, generating calibration points, via operation 706, and updating the depth information, via operation 708. The depth information can be determined/detected using a variety of systems including but not limited to a structured-light stereo device or a similar system such as the structured-light stereo device 104 of FIG. 1. The time of flight information can be determined using a variety of systems including but not limited to a time of flight device or a similar system such as the time of flight device 106 of FIG. 1.

The depth information (including but not limited to depth measurements) and the time of flight information (including but not limited to time of flight measurements) can be determined simultaneously using a synchronized data capture mechanism that provides time-syncing between the structured-light stereo device and time of flight device components of the hybrid system. The depth information can be utilized to determine a variety of maps including but not limited to a depth map and a reflectivity map. The time of flight information can be utilized to determine a variety of data points including but not limited to calibration points. As an example, depth information that comprises a depth map can be updated using the data points (e.g., calibration points) determined or extracted from the time of flight information to provide an enhanced depth map.

Figure 8:
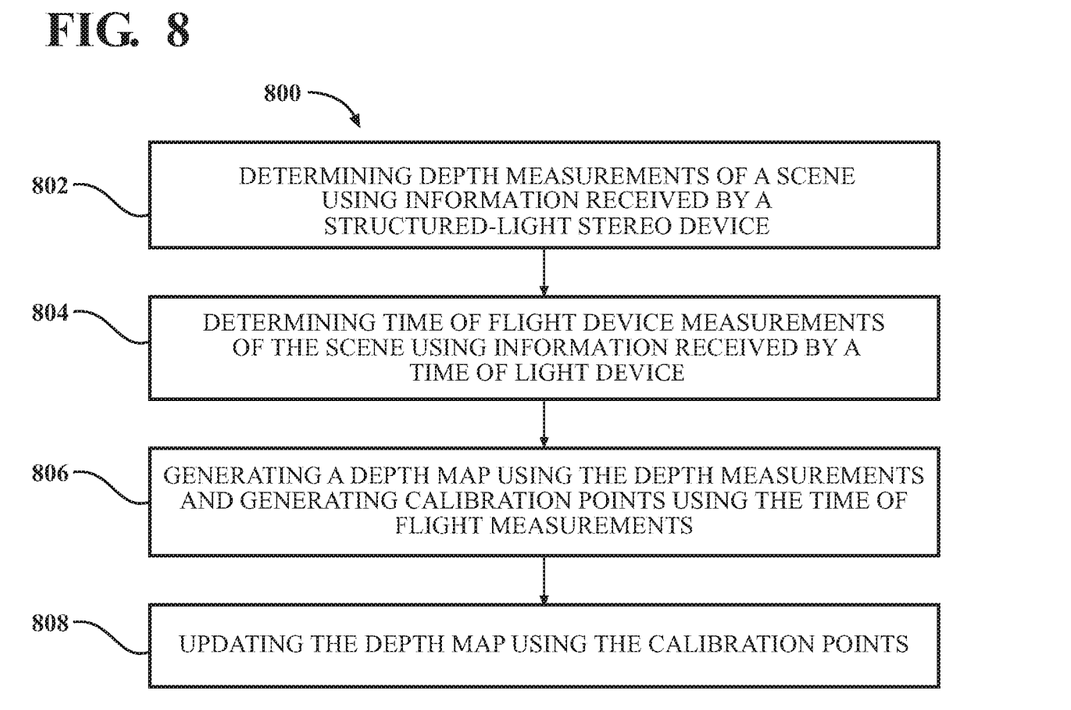
FIG. 8 is a flow chart illustrating a method for real-time depth sensing.

FIG. 8 is a flow chart illustrating a method 800 for real-time depth sensing. The real-time depth sensing can be used for a plurality of applications including but not limited to any of autonomous vehicle applications, robotics applications, and industrial manufacturing applications. The method 800 can be executed using the systems and devices described with respect to FIGS. 1-4, including but not limited to a vehicle (e.g., the vehicle 100 of FIG. 1 or the vehicle 200 of FIG. 2) that includes a computing device and a hybrid system having a structured-light stereo device and a time of flight device. The structured-light stereo device and time of flight device components or sub-systems can be housed within the same headlight space of the vehicle, can be housed in another shared location (e.g., on the top of the vehicle, on the front of the vehicle near the license plate housing, etc.), or can be housed within the vehicle using a different configuration. The method 800 can be performed, for example, by executing a machine-readable program or other computer-executable instructions. The method 800 can be implemented directly in hardware, firmware, software executed by hardware, circuitry, or a combination thereof.

The method 800 includes determining depth measurements of a scene using information received by the structured-light stereo device, via operation 802; determining time of flight measurements of the scene using information received by the time of flight device, via operation 804; generating a depth map using the depth measurements and generating calibration points using the time of flight measurements, via operation 806; and updating the depth map using the calibration points, via operation 808. In some implementations, the structured-light stereo device comprises an illuminator (i.e., a light source) and a camera within each headlight space of a vehicle and the time of flight device comprises a Light Detection and Ranging (LIDAR) signal device (e.g., a device with a light sensor and a light source or a device with only a light sensor) within each headlight space of the vehicle. The time of flight measurements can be spatially sparse (i.e., thinly dispersed or scattered) across various points of the scene or can be spatially clustered (i.e., densely focused) on a certain area of the scene.

To determine the depth measurements and the time of flight measurements via operations 802 and 804, respectively, the method 800 can include projecting an image onto the scene using both the structured-light stereo device and the time of flight device and synchronizing the projection of the image using metadata and timing information associated with both the structured-light stereo device and the time of flight device. By synchronizing the projection of the image, the method 800 provides synchronized data capture between the structured-light stereo device and the time of flight device.

The method 800 can also include determining the type of the image using information associated with the scene prior to the projection of the image onto the scene and updating the image using the updated depth map to provide a feedback loop mechanism that continuously updates and enhances the image generated and utilized in the projection. The image that is projected can be a variety of image types with varying levels of details including but not limited to less detailed types (e.g., a line, a beam) and more detailed types (e.g., an array, a hybrid pattern, and a structured pattern). The image type and detail level can be determined by the hybrid system based on varying information associated with the scene (e.g., one image type is used for a certain road condition and another image type is used for a different road condition).

As an example, if the generation of a first image that is of a less detailed image type (e.g., a line) by the hybrid system does not result in the generation of a high resolution depth map associated with a certain scene navigated by the vehicle, the hybrid system can utilize the first image and this feedback information to generate a second image that is of a more detailed image type (e.g., hybrid pattern) to enhance the resolution of the depth map that is generated when the vehicle navigates the certain scene again or a similar scene.

To generate the calibration points via operation 806, the method 800 can include calculating known distances or relative offset measurements between corresponding objects or portions of the scene of the depth and time of flight measurements as described with respect to FIG. 5. The calibration points can be utilized to calibrate various devices (e.g., cameras, light sources) associated with the hybrid system (such as the hybrid system 102 of FIG. 1).

To provide the updated depth map via operation 808, the method 800 can include calibrating the camera within each headlight space of the vehicle using the depth map and the calibration points (both generated via operation 806). The calibration of the camera enables the hybrid system to generate enhanced depth information (e.g., enhanced or updated depth maps). In addition to depth maps, the method 800 can generate a variety of map types including but not limited to reflectivity maps using the depth measurements and the time of flight measurements.

The method 800 can further include detecting an object within the scene and targeting or focusing the time of flight measurements to a portion of the scene that includes the object to enable focusing or tuning of the autonomous system, wherein the updated depth map corresponds to or focuses on the portion of the scene. As an example, as the vehicle is navigating a roadway of a scene, the time of flight device of the hybrid system can detect an object such as a fallen tree half a mile ahead on the roadway. The hybrid system can then focus the time of flight measurements determined via the time of flight device on that portion of the roadway that includes the fallen tree to aid in the navigation of the vehicle (e.g., provide an instruction to reroute to avoid the fallen tree and related traffic).

Figure 9:
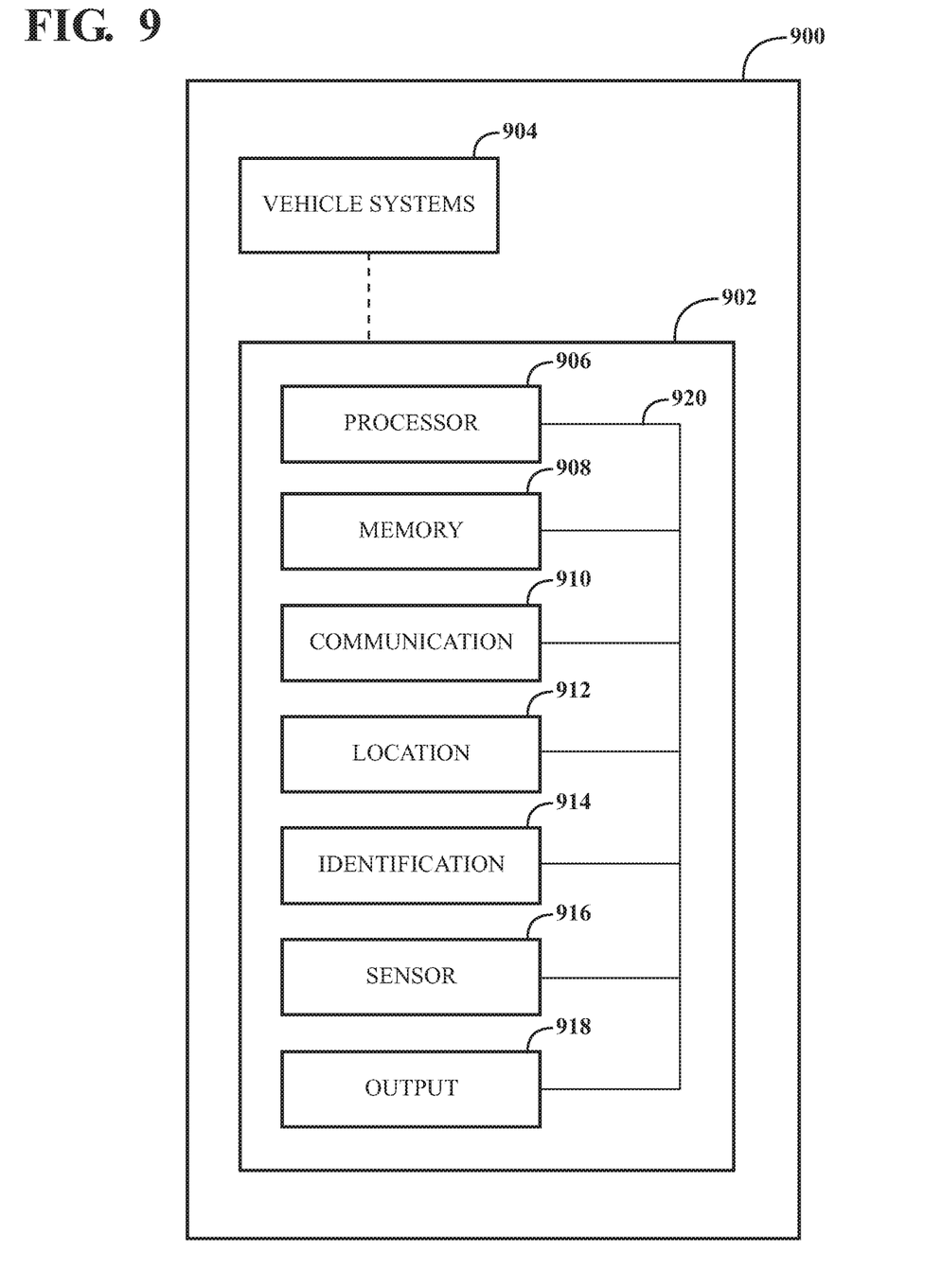
FIG. 9 is a diagram illustrating an example of a controller apparatus of a vehicle.

FIG. 9 is a diagram of an example of a control 902 of a vehicle 900. The various methods, aspects, features, systems, and elements disclosed here can be implemented via the vehicle 900. The vehicle 900 can be manually operated, semi-autonomous, fully autonomous, or any combination thereof. The vehicle 900 includes a controller 902 which can be used for communication, command, and/or control of various vehicle systems 904 or combinations of the various vehicle systems 904.

The controller 902 can include any combination of a processor 906, a memory 908, a communication component 910, a location component 912, an identification component 914, a sensor component 916, an output component 918, and/or a communication bus 920.

The processor 906 can execute one or more instructions such as program instructions stored in the memory 908. As an example, the processor 906 can include but is not limited to one or more of the following: central processing units (CPUs); general purpose processors with one or more processing cores; special purpose processors with one or more cores; digital signal processors (DSPs); microprocessors; controllers; microcontrollers; integrated circuits; Application Specific Integrated Circuits (ASICs); Field Programmable Gate Arrays (FPGA); or programmable logic controllers.

The memory 908 can include a tangible non-transitory computer-readable medium that can be used to store program instructions such as computer-readable instructions, machine-readable instructions, or any type of data that can be used by the processor 906. As an example, the memory 908 can include any combination of computer readable media that can be accessed by the processor 906, including but not limited to read only memory (ROM) or random-access memory (RAM). Further, the memory 908 can include any combination of volatile memory or non-volatile memory including but not limited to: solid state drives (SSDs); flash memory; hard disk drives (HDDs); dynamic random-access memory (DRAM); or erasable programmable read-only memory (EPROM).

The communication component 910 can be used to transmit or receive signals, such as electronic signals, via a wired or wireless medium. As an example, the communication component 910 can transmit or receive signals such as radio frequency (RF) signals which can be used to transmit or receive data that can be used by the processor 906 or stored in the memory 908. The communication component 910 can include but is not limited to a local area network (LAN), a wide area network (WAN), a storage area network (SAN), a virtual private network (VPN), a cellular telephone network, the Internet, or any combination thereof. The communication component 910 can transmit or receive data using a communication protocol including but not limited to a transmission control protocol (TCP), user Datagram protocol (UDP), Internet protocol (IP), real-time transport protocol (RTP), or hypertext transport protocol (HTTP).

The location component 912 can generate navigation data or geolocation data that can be used to determine a velocity, an orientation, a latitude, a longitude, or an altitude for the vehicle 900. The location component 912 can include one or more navigation devices that are able to use navigational systems including but not limited to GPS, the long-range navigation system (LORAN), the Wide Area Augmentation System (WAAS), or the global navigation satellite system (GLONASS).

The identification component 914 can include specialized instructions for any combination of the following: operating the vehicle 900; communicating with remote data sources; determining the state of the vehicle 900; or determining the state or identity of extra-vehicular objects. In some implementations, a portion of the memory 908 can be coupled to the identification component 914 via the communication bus 920.

The sensor component 916 can include one or more sensors or sensor systems that detect the state or condition of the physical environment either internal or external to the vehicle 900. In some implementations, the sensor component 916 can include but is not limited to any combination of: an accelerometer, a gyroscope, a still image sensor, a video image sensor, an infrared sensor, a near-infrared sensor, a LIDAR system, a radar system, a sonar system, a thermometer, a barometer, a moisture sensor, a vibration sensor, a capacitive input sensor, or a resistive input sensor.

As examples, the sensor component 916 can detect the state of stationary or moving objects external to the vehicle 900 including but not limited to: physical structures such as buildings, roadways, and surrounding landscape; vehicles such as automobiles and motorcycles; or non-vehicular entities such as pedestrians and vehicle drivers. Based on the sensory input detected by the sensor component 916, the sensor component 916 can generate sensor data that can be used to: operate the vehicle 900; determine the state or condition of the vehicle 900; or determine the state or condition of objects external to the vehicle 900.

The output component 918 can include one or more output devices that can be used to generate outputs including sensory outputs such as visual outputs, audible outputs, haptic outputs, or electrical outputs. The one or more output devices can include but are not limited to: visual output components that illuminate portions of the environment surrounding the vehicle 900, display components that display still images or video images including but not limited to a liquid crystal display (LCD), an organic light-emitting diode (OLED) display, or a cathode ray tube (CRT) display; audio output components including but not limited to loudspeakers; or haptic output components to produce vibrations or other types of tactile outputs.

The communication bus 920 can include an internal bus or an external bus and can be used to couple any combination of the processor 906, the memory 908, the communication component 910, the location component 912, the identification component 914, the sensor component 916, or the output component 918. As an example, the communication bus 920 can include one or more buses including but not limited to: a peripheral component interconnect (PCI), Serial AT attachment (SATA), a HyperTransport (HT) bus, or a universal serial bus (USB).

The vehicle systems 904 can include imaging systems, battery systems, powertrain systems, transmission systems, braking systems, steering systems, suspension systems (not shown), or any other systems used to interact with the environment surrounding the vehicle and/or cause or control movement of the vehicle 900.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

What is claimed is:

1. A system for depth sensing, the system comprising:
   a structured-light stereo device;
   a time of flight device;

a modulator; and a computing device including a processor configured to execute instructions stored in a memory to:

project a light pattern onto a scene, wherein modulation of the light pattern is modified based on at least one of mapping information, route information, surface conditions, or speed information from a vehicle moving through the scene, determine depth measurements of the scene using information about the light pattern received by the structured-light stereo device, determine time of flight measurements of the scene using information about the light pattern received by the time of flight device, wherein the light pattern is projected onto the scene using the modulator and both the structured-light stereo device and the time of flight device to determine the depth measurements and the time of flight measurements, generate a depth map using the depth measurements, generate calibration points using the time of flight measurements and the depth measurements, each calibration point including information related to distance between a corresponding time of flight measurement and a corresponding depth measurement, and update the depth map using the calibration points.

2. The system of claim 1, wherein the structured-light stereo device comprises an illuminator and a camera within a headlight space of a vehicle, on a top of the vehicle, or on a front of the vehicle.

3. The system of claim 2, wherein the time of flight device comprises a Light Detection and Ranging (LIDAR) signal device within the headlight space of the vehicle, on the top of the vehicle, or on the front of the vehicle.

4. The system of claim 2, wherein the instructions to update the depth map using the calibration points further comprise instructions to:

calibrate the camera within the headlight space of the vehicle, on the top of the vehicle, or on the front of the vehicle using the depth map and the calibration points.

5. The system of claim 1, wherein the processor is further configured to execute instructions to:

synchronize projection of the light pattern using the modulator based on metadata and timing information associated with both the structured-light stereo device and the time of flight device.

6. The system of claim 1, wherein the light pattern comprises any of a line, a beam, an array, a hybrid pattern, and a structured pattern.

7. The system of claim 1, wherein the processor is further configured to execute instructions to:

determine the modulation of the light pattern based on an analysis of similar scenes that the vehicle has encountered prior to projection of the light pattern onto the scene.

8. The system of claim 1, wherein the processor is further configured to execute instructions to:

generate a reflectivity map using the depth measurements and the time of flight measurements.

9. The system of claim 1, wherein the processor is further configured to execute instructions to:

detect an object within the scene; and target a portion of the light pattern and the time of flight measurements to only a portion of the scene that includes the object, wherein the depth map corresponds to the portion of the scene.

10. The system of claim 1, wherein a density of the time of flight measurements is thinly dispersed across the scene.

11. A method, comprising:

projecting a light pattern onto a scene to generate a scene projection using a modulator, a structured-light stereo device, and a time of flight device, wherein modulation of wavelengths in the light pattern is modified based on at least one of detected object information, mapping information, route information, surface conditions, or speed information from a vehicle moving through the scene;

determining depth measurements of the scene projection using information from the structured-light stereo device;

determining time of flight measurements of the scene projection using information from the time of flight device;

generating a depth map using the depth measurements;

generating calibration points using distance measurements between corresponding time of flight measurements and corresponding depth measurements;

updating the depth map using the calibration points; and controlling operation of an automated system of the vehicle based on the depth map.

12. The method of claim 11, further comprising:

synchronizing projection of the light pattern using the modulator and metadata and timing information associated with the structured-light stereo device and the time of flight device.

13. A method, comprising:

generating a first hybrid pattern image that includes a first amount of structured-light information and Light Detection and Ranging (LIDAR) or radar information using a structured-light stereo device and a time of flight device;

projecting the first hybrid pattern image onto a portion of a scene to generate a first projection using a modulator, the structured-light stereo device, and the time of flight device;

performing a first synchronized data capture in response to the first projection;

generating a depth map based on the first synchronized data capture;

generating a plurality of calibration points based on the LIDAR or radar information;

performing a camera calibration based on the depth map and the plurality of calibration points;

generating a second hybrid pattern image that includes a second amount of structured-light information and LIDAR or radar information using the structured-light stereo device and the time of flight device, the second amount different from the first amount, and the second amount based on a change in mapping information, route information, surface conditions, or speed information from a vehicle moving through the scene;

projecting the second hybrid pattern image onto the portion of the scene to generate a second projection using the modulator, the structured-light stereo device, and the time of flight device;

performing a second synchronized data capture in response to the second projection; and generating an updated depth map based on the second synchronized data capture, the depth map, and a result of the camera calibration.

14. The method of claim 13, wherein the structured-light information is based on a depth measurement and the LIDAR or radar information is based on a time of flight measurement.

15. The method of claim 13, wherein the depth map is a stereo depth map.

16. The method of claim 13, wherein the depth map and the plurality of calibration points are generated simultaneously.

17. The method of claim 13, wherein each of the plurality of calibration points is calculated as a relative offset measurement between the structured-light information and the LIDAR or radar information.

18. The method of claim 11, further comprising:
   detecting an object within the scene; and
   targeting a portion of the light pattern and the time of flight measurements to only a portion of the scene that includes the object, wherein the depth map corresponds to the portion of the scene.

19. The method of claim 11, wherein the light pattern comprises any of a line, a beam, an array, a hybrid pattern, and a structured pattern.

20. The method of claim 11, further comprising:
   determining the modulation of the light pattern based on an analysis of similar scenes that the vehicle has encountered prior to projection of the light pattern onto the scene.

* * * * *